United States Patent
Hodgson et al.

(10) Patent No.: US 11,016,700 B1
(45) Date of Patent: May 25, 2021

(54) ANALYZING APPLICATION-SPECIFIC CONSUMPTION OF STORAGE SYSTEM RESOURCES

(71) Applicant: PURE STORAGE, INC., Mountain View, CA (US)

(72) Inventors: Steven Hodgson, San Jose, CA (US); Ronald Karr, Palo Alto, CA (US)

(73) Assignee: Pure Storage, Inc., Mountain View, CA (US)

( * ) Notice: Subject to any disclaimer, the term of this patent is extended or adjusted under 35 U.S.C. 154(b) by 14 days.

(21) Appl. No.: 16/527,700

(22) Filed: Jul. 31, 2019

Related U.S. Application Data

(63) Continuation of application No. 16/202,305, filed on Nov. 28, 2018, now Pat. No. 10,416,924, which is a continuation of application No. 15/401,655, filed on Jan. 9, 2017, now Pat. No. 10,162,566.

(60) Provisional application No. 62/425,423, filed on Nov. 22, 2016.

(51) Int. Cl.
| | |
|---|---|
| *G06F 12/00* | (2006.01) |
| *G06F 3/06* | (2006.01) |
| *G06F 16/00* | (2019.01) |
| *G06F 12/02* | (2006.01) |

(52) U.S. Cl.
CPC .......... *G06F 3/0653* (2013.01); *G06F 3/0604* (2013.01); *G06F 3/0605* (2013.01); *G06F 3/067* (2013.01); *G06F 3/0643* (2013.01); *G06F 3/0683* (2013.01); *G06F 12/0246* (2013.01); *G06F 16/00* (2019.01)

(58) Field of Classification Search
CPC .... G06F 3/0653; G06F 3/0604; G06F 3/0683; G06F 12/0246
See application file for complete search history.

(56) References Cited

U.S. PATENT DOCUMENTS

| | | |
|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |
| 6,085,333 A | 7/2000 | DeKoning et al. |

(Continued)

FOREIGN PATENT DOCUMENTS

| | | |
|---|---|---|
| EP | 0725324 A2 | 8/1996 |
| EP | 2320320 A1 | 5/2011 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Shawn X Gu

(57) ABSTRACT

Accumulating application-level statistics in a storage system that includes a plurality of block storage devices, including: identifying, from data stored on a block storage device, one or more sub-regions of the data stored on the block storage device that are associated with an application; and compiling, from statistics maintained for each of the one or more sub-regions of the stored data associated with the application, cumulative statistics for the application.

18 Claims, 8 Drawing Sheets

(56) References Cited

U.S. PATENT DOCUMENTS

| | | |
|---|---|---|
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,200,887 B2 | 6/2012 | Bennett |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,311,182 B2 | 4/2016 | Bennett |
| 9,444,822 B1 | 9/2016 | Borowiec et al. |
| 9,507,532 B1 | 11/2016 | Colgrove et al. |
| 9,632,870 B2 | 4/2017 | Bennett |
| 10,162,566 B2 | 12/2018 | Hodgson et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0036568 A1 | 2/2006 | Moore et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0167221 A1 | 7/2011 | Pangal et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258506 A1* | 9/2014 | Stickle ............... G06F 21/6218 709/224 |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 | 4/2016 | Mutha et al. |
| 2016/0239408 A1 | 8/2016 | Sule et al. |
| 2016/0350009 A1 | 12/2016 | Cerreta et al. |

(56) References Cited

U.S. PATENT DOCUMENTS

| | | |
|---|---|---|
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2018/0143782 A1 | 5/2018 | Hodgson et al. |

FOREIGN PATENT DOCUMENTS

| | | |
|---|---|---|
| WO | WO-2012/087648 A1 | 6/2012 |
| WO | WO-2013071087 A1 | 5/2013 |
| WO | WO-2014/110137 A1 | 7/2014 |
| WO | WO-2016/015008 A1 | 12/2016 |
| WO | WO-2016/190938 A1 | 12/2016 |
| WO | WO-2016/195759 A1 | 12/2016 |
| WO | WO-2016/195958 A1 | 12/2016 |
| WO | WO-2016/195961 A1 | 12/2016 |
| WO | WO-2018098063 A1 | 5/2018 |

OTHER PUBLICATIONS

PCMAG, *Storage Array Definition*, Published May 10, 2013. <http://web.archive.org/web/20130510121646/http://www.pcmag.com/encyclopedia/term/52091/storage-array>, 2 pages.

Google search of "storage array define" performed by the Examiner on Nov. 4, 2015 for U.S. Appl. No. 14/725,278, Results limited to entries dated before 2012, 1 page.

Techopedia, *What is a disk array*, techopedia.com (online), Jan. 13, 2012, 1 page, URL: web.archive.org/web/20120113053358/http://www.techopedia.com/definition/1009/disk-array.

Webopedia, *What is a disk array*, webopedia.com (online), May 26, 2011, 2 pages, URL: web/archive.org/web/20110526081214/http://www.webopedia.com/TERM/D/disk_array.html.

Li et al., *Access Control for the Services Oriented Architecture*, Proceedings of the 2007 ACM Workshop on Secure Web Services (SWS '07), Nov. 2007, pp. 9-17, ACM New York, NY.

Hota et al., *Capability-based Cryptographic Data Access Control in Cloud Computing*, International Journal of Advanced Networking and Applications, col. 1, Issue 1, Aug. 2011, 10 pages, Eswar Publications, India.

Faith, *dictzip file format*, GitHub.com (online), accessed Jul. 28, 2015, 1 page, URL: github.com/fidlej/idzip.

Wikipedia, *Convergent Encryption*, Wikipedia.org (online), accessed Sep. 8, 2015, 2 pages, URL: en.wikipedia.org/wiki/Convergent_encryption.

Storer et al., *Secure Data Deduplication*, Proceedings of the 4th ACM International Workshop on Storage Security And Survivability (StorageSS'08), Oct. 2008, 10 pages, ACM New York, NY. USA, DOI: 10.1145/1456469.1456471.

ETSI, *Network Function Virtualisation (NFV); Resiliency Requirements*, ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Microsoft, *Hybrid for SharePoint Server 2013—Security Reference Architecture*, Microsoft (online), Oct. 2014, 53 pages, URL: hybrid.office.com/img/Security_Reference_Architecture.pdf.

Microsoft, *Hybrid Identity*, Microsoft (online), Apr. 2014, 36 pages, URL: www.aka.ms/HybridIdentityWp.

Microsoft, *Hybrid Identity Management*, Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Bellamy-McIntyre et al., *OpenID and the Enterprise: A Model-based Analysis of Single Sign-On Authentication*, 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.

Kong, *Using PCI Express As The Primary System Interconnect In Multiroot Compute, Storage, Communications And Embedded Systems*, White Paper, IDT.com (online), Aug. 28, 2008, 12 pages, URL: www.idt.com/document/whp/idt-pcie-multi-root-white-paper.

Hu et al., *Container Marking: Combining Data Placement, Garbage Collection and Wear Levelling for Flash*, 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Jul. 18, 2016, 12 pages.

International Search Report and Written Opinion, PCT/US2016/015008, dated May 4, 2016, 12 pages.

International Search Report and Written Opinion, PCT/US2016/020410, dated Jul. 8, 2016, 12 pages.

International Search Report and Written Opinion, PCT/US2016/032084, dated Jul. 18, 2016, 12 pages.

International Search Report and Written Opinion, PCT/US2016/016333, dated Jun. 8, 2016, 12 pages.

International Search Report and Written Opinion, PCT/US2016/032052, dated Aug. 30, 2016, 17 pages.

International Search Report and Written Opinion, PCT/US2016/035492, dated Aug. 17, 2016, 10 pages.

International Search Report and Written Opinion, PCT/US2016/036693, dated Aug. 29, 2016, 10 pages.

International Search Report and Written Opinion, PCT/US2016/038758, dated Oct. 7, 2016, 10 pages.

International Search Report and Written Opinion, PCT/US2016/040393, dated Sep. 22, 2016, 10 pages.

International Search Report and Written Opinion, PCT/US2016/044020, dated Sep. 30, 2016, 11 pages.

International Search Report and Written Opinion, PCT/US2016/044874, dated Oct. 7, 2016, 11 pages.

International Search Report and Written Opinion, PCT/US2016/044875, dated Oct. 5, 2016, 13 pages.

International Search Report and Written Opinion, PCT/US2016/044876, dated Oct. 21, 2016, 12 pages.

International Search Report and Written Opinion, PCT/US2016/044877, dated Sep. 29, 2016, 13 pages.

International Search Report and Written Opinion, PCT/US2017/062498, dated Feb. 13, 2018, 11 pages.

\* cited by examiner

ANALYZING APPLICATION-SPECIFIC CONSUMPTION OF STORAGE SYSTEM RESOURCES

CROSS-REFERENCE TO RELATED APPLICATIONS

This application is a continuation application of and claims priority from U.S. Pat. No. 10,416,924, issued Sep. 17, 2019, which is a continuation application of and claims priority from U.S. Pat. No. 10,162,566, issued Dec. 25, 2018, which is a non-provisional application for patent entitled to a filing date and claiming the benefit of earlier-filed U.S. Provisional Patent Application Ser. No. 62/425,423, filed Nov. 22, 2016.

DESCRIPTION OF EMBODIMENTS

Figure 1:
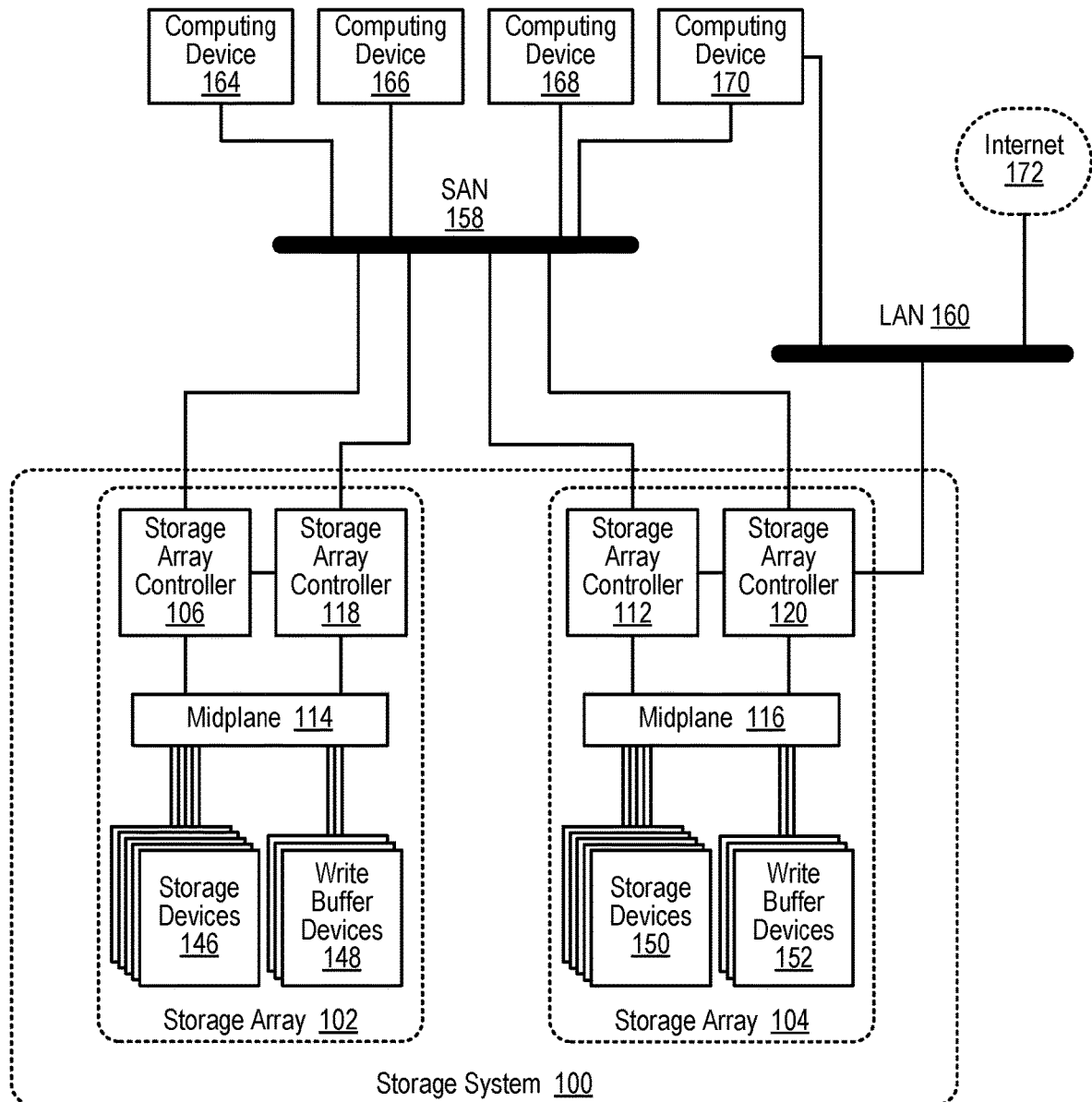
FIG. 1 sets forth a block diagram of a storage system configured for accumulating application-level statistics according to embodiments of the present disclosure.

Example methods, apparatus, and products for accumulating application-level statistics in a storage system that includes a plurality of block storage devices in accordance with the present disclosure are described with reference to the accompanying drawings, beginning with FIG. 1. FIG. 1 sets forth a block diagram of a storage system (100) configured for accumulating application-level statistics according to embodiments of the present disclosure.

The storage system (100) depicted in FIG. 1 includes a plurality of storage arrays (102, 104), although accumulating application-level statistics in a storage system in accordance with embodiments of the present disclosure may be carried out in storage systems that include only a single storage array. Each storage array (102, 104) may be embodied as a collection of computer hardware devices that provide persistent data storage to users of the storage system (100). Each storage array (102, 104) may include a collection of data storage devices that are mounted within one or more chassis, racks, or other enclosure. Although not expressly depicted in FIG. 1, each storage array (102, 104) may include a plurality of power supplies that deliver power to one or more components within the storage system (100) via a power bus, each storage array (102, 104) may include a plurality of data communications networks that enables one or more components within the storage system (100) to communicates, each storage array (102, 104) may include a plurality of cooling components that are used to cool one or more components within the storage system (100), and so on.

The example storage arrays (102, 104) depicted in FIG. 1 may provide persistent data storage for computing devices (164, 166, 168, 170) that are coupled to the storage system (100) via one or more data communications networks. Each of the computing devices (164, 166, 168, 170) depicted in FIG. 1 may be embodied, for example, as a server, a workstation, a personal computer, a notebook, a smartphone, a tablet computer, or the like. The computing devices (164, 166, 168, 170) in the example of FIG. 1 are coupled for data communications to the storage arrays (102, 104) through a storage area network ('SAN') (158). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers will appreciate that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The computing devices (164, 166, 168, 170) depicted in FIG. 1 are also coupled for data communications to the storage arrays (102, 104) through a local area network (160) ('LAN'). The LAN (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Real Time Protocol ('RTP') and others as will occur to those of skill in the art. The LAN (160) depicted in FIG. 1 may be coupled to other computing devices not illustrated in FIG. 1, for example, via the Internet (172). Although only one storage array (104) is expressly depicted as being coupled to the computing devices (164, 166, 168, 170) via the LAN (160), readers will appreciate that other storage arrays (102) in the storage system (100) may also be coupled to the computing devices (164, 166, 168, 170) via the same LAN (160) or via a different LAN.

Each storage array (102, 104) depicted in FIG. 1 includes a plurality of storage array controllers (106, 112, 118, 120). Each storage array controller (106, 112, 118, 120) may be embodied as a module of automated computing machinery comprising computer hardware, computer software, or a combination of computer hardware and software. Each storage array controller (106, 112, 118, 120) may be configured to carry out various storage-related tasks such as, for example, writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112, 118, 120) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112, 118, 120) may include, for example, a data communications adapter configured to support communications via the SAN (158) and the LAN (160). Although only one of the storage array controllers (120) in the example of FIG. 1 is depicted as being coupled to the LAN (160) for data communications, readers will appreciate that each storage array controller (106, 112, 118, 120) may be independently coupled to the LAN (160). Each storage array controller (106, 112, 118, 120) may also include, for example, an I/O controller or the like that couples the storage array controller (106, 112, 118, 120) for data communications, through a midplane (114, 116), to a number of storage devices (146, 150), and a number of write buffer devices (148, 152) that are utilized as write caches.

In the example depicted in FIG. 1, the presence of multiple storage array controllers (106, 112, 118, 120) in each storage array (102, 104) can enable each storage array (102, 104) to be highly available as there are independent, redundant storage array controllers (106, 112, 118, 120) that are capable of servicing access requests (e.g., reads, writes) to the storage arrays (102, 104). In some embodiments, each storage array controller (106, 112, 118, 120) in a particular storage array (102, 104) may appear to be active to the computing devices (164, 166, 168, 170) as each storage array controller (106, 112, 118, 120) may be available for receiving requests to access the storage array (102, 104) from the computing devices (164, 166, 168, 170) via the SAN (158) or LAN (160). Although storage array controller (106, 112, 118, 120) may be available for receiving requests to access the storage array (102, 104), however, in some embodiments only one storage array controller (106, 112, 118, 120) may actively be allowed to direct access requests to the storage devices (146, 150) or write buffer devices (148, 152). For ease of explanation, a storage array controller that is allowed to direct access requests to the storage devices (146, 150) or write buffer devices (148, 152) may be referred to herein as an 'active' storage array controller whereas a storage array controller that is not allowed to direct access requests to the storage devices (146, 150) or write buffer devices (148, 152) may be referred to herein as a 'passive' storage array controller. Readers will appreciate that because a passive storage array controller may still receive requests to access the storage array (102, 104) from the computing devices (164, 166, 168, 170) via the SAN (158) or LAN (160), the passive storage array controller may be configured to forward any access requests received by the passive storage array controller to the active storage array controller.

Consider an example in which a first storage array controller (106) in a first storage array (102) is the active storage array controller that is allowed to direct access requests to the storage devices (146) or write buffer devices (148) within the first storage array (102), while a second storage array controller (118) in the first storage array (102) is the passive storage array controller that is not allowed to direct access requests to the storage devices (146) or write buffer devices (148) within the first storage array (102). In such an example, the second storage array controller (118) may continue to receive access requests from the computing devices (164, 166, 168, 170) via the SAN (158) or LAN (160). Upon receiving access requests from the computing devices (164, 166, 168, 170), the second storage array controller (118) may be configured to forward such access requests to the first storage array controller (106) via a communications link between the first storage array controller (106) and the second storage array controller (118). Readers will appreciate that such an embodiment may reduce the amount of coordination that must occur between the first storage array controller (106) and the second storage array controller (118) relative to an embodiment where both storage array controllers (106, 118) are allowed to simultaneously modify the contents of the storage devices (146) or write buffer devices (148).

Although the example described above refers to an embodiment where the first storage array controller (106) is the active storage array controller while the second storage array controller (118) is the passive storage array controller, over time such designations may switch back and forth. For example, an expected or unexpected event may occur that results in a situation where the first storage array controller (106) is the passive storage array controller while the second storage array controller (118) is the active storage array controller. An example of an unexpected event that could cause a change in the roles of each storage array controller (106, 118) is the occurrence of a failure or error condition with the first storage array controller (106) that causes the storage array (102) to fail over to the second storage array controller (118). An example of an expected event that could cause a change in the roles of each storage array controller (106, 118) is the expiration of a predetermined period of time, as the first storage array controller (106) may be responsible for interacting with the storage devices (146) and the write buffer devices (148) during a first time period while the second storage array controller (118) may be responsible for interacting with the storage devices (146) and the write buffer devices (148) during a second time period. Readers will appreciate that although the preceding paragraphs describe active and passive storage array controllers with reference to the first storage array (102), the storage array controllers (112, 120) that are part of other storage arrays (104) in the storage system (100) may operate in a similar manner.

Each storage array (102, 104) depicted in FIG. 1 includes one or more write buffer devices (148, 152). Each write buffer device (148, 152) may be configured to receive, from the one of the storage array controller (106, 112, 118, 120), data to be stored in one or more of the storage devices (146, 150). In the example of FIG. 1, writing data to the write buffer device (148, 152) may be carried out more quickly than writing data to the storage device (146, 150). The storage array controllers (106, 112, 118, 120) may therefore be configured to effectively utilize the write buffer devices (148, 152) as a quickly accessible buffer for data destined to be written to one or the storage devices (146, 150). By utilizing the write buffer devices (148, 152) in such a way, the write latency experienced by users of the storage system (100) may be significantly improved relative to storage systems that do not include such write buffer devices (148, 152). The write latency experienced by users of the storage system (100) may be significantly improved relative to storage systems that do not include such write buffer devices (148, 152) because the storage array controllers (106, 112, 118, 120) may send an acknowledgment to the user of the storage system (100) indicating that a write request has been serviced once the data associated with the write request has been written to one or the write buffer devices (148, 152), even if the data associated with the write request has not yet been written to any of the storage devices (146, 150).

The presence of the write buffer devices (148, 152) may also improve the utilization of the storage devices (146, 150) as a storage array controller (106, 112, 118, 120) can accumulate more writes and organize writing to the storage devices (146, 150) for greater efficiency. Greater efficiency can be achieved, for example, as the storage array controller (106, 112, 118, 120) may have more time to perform deeper compression of the data, the storage array controller (106, 112, 118, 120) may be able to organize the data into write blocks that are in better alignment with the underlying physical storage on the storage devices (146, 150), the storage array controller (106, 112, 118, 120) may be able to perform deduplication operations on the data, and so on. Such write buffer devices (148, 152) effectively convert storage arrays of solid-state drives (e.g., "Flash drives") from latency limited devices to throughput limited devices. In such a way, the storage array controller (106, 112, 118, 120) may be given more time to better organize what is written to the storage devices (146, 150), but after doing so, are not then mechanically limited like disk-based arrays are.

Each storage array (102, 104) depicted in FIG. 1 includes one or more storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, solid-state drives, and the like.

The storage array controllers (106, 112) of FIG. 1 may be useful in accumulating application-level statistics according to embodiments of the present disclosure. The storage array controllers (106, 112) may assist in accumulating application-level statistics by performing steps and functions as will be described in greater detail below. The steps and functions described below may be carried out by one or more of the storage array controllers (106, 112), for example, through the use of special purpose computer program instructions that are executing on computer hardware such as one or more CPUs in the storage array controllers (106, 112).

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art. In fact, accumulating application-level statistics in a storage system that includes a plurality of block storage devices may be carried out in storage systems that consists of blades mounted within a chassis, where each blade can include processing resources, storage resources, any combination of processing resources and storage resources, along with other components.

Accumulating application-level statistics in accordance with embodiments of the present disclosure is generally implemented with computers. In the system of FIG. 1, for example, all the computing devices (164, 166, 168, 170) and storage controllers (106, 112, 118, 120) may be implemented to some extent at least as computers. For further explanation, therefore, FIG. 2 sets forth a block diagram of a storage array controller (202) useful in accumulating application-level statistics in a storage system that includes a plurality of block storage devices according to embodiments of the present disclosure.

Figure 2:
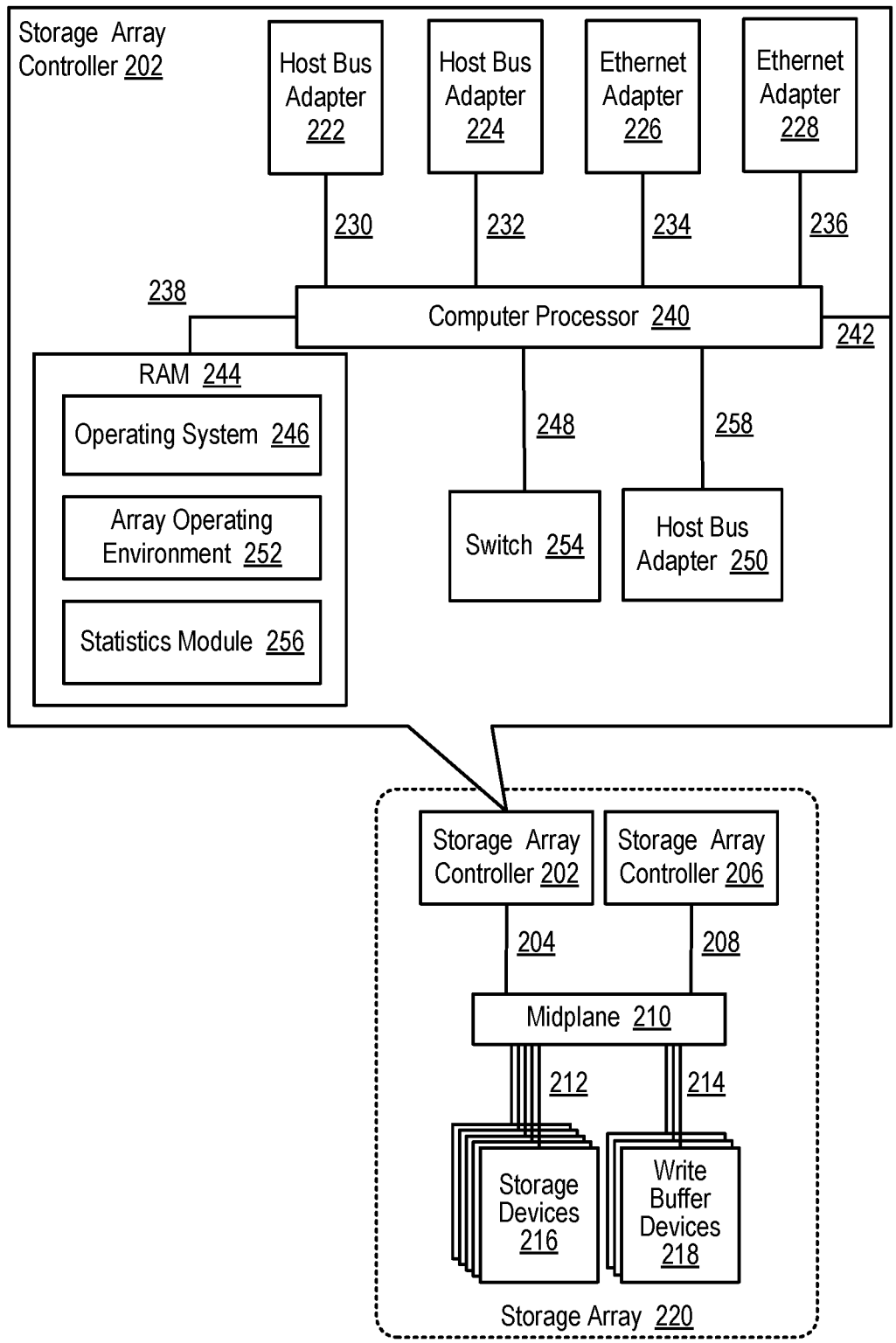
FIG. 2 sets forth a block diagram of a storage array controller useful in accumulating application-level statistics in a storage system that includes a plurality of block storage devices according to embodiments of the present disclosure.

The storage array controllers (202, 206) depicted in FIG. 2 may be similar to the storage array controllers depicted in FIG. 1, as the storage array controllers (202, 206) of FIG. 2 may be communicatively coupled, via a midplane (210), to one or more storage devices (216) and to one or more write buffer devices (218) that are included as part of a storage array (220). The storage array controllers (202, 206) may be coupled to the midplane (210) via one or more data communications links (204, 208) and the midplane (206) may be coupled to the storage devices (216) and the memory buffer devices (218) via one or more data communications links (212, 214). The data communications links (204, 208, 212, 214) of FIG. 2 may be embodied, for example, as a Peripheral Component Interconnect Express ('PCIe') bus, as a Serial Attached SCSI ('SAS') data communications link, and so on. Although only one of the storage array controllers (202) is depicted in detail, readers will appreciate that other storage array controllers (206) may include similar components. For ease of explanation, however, the detailed view of one of the storage array controllers (202) will be described below.

The storage array controller (202) detailed in FIG. 2 can include at least one computer processor (240) or 'CPU' as well as random access memory ('RAM') (244). The computer processor (240) may be connected to the RAM (244) via a data communications link (238), which may be embodied as a high speed memory bus such as a Double-Data Rate 4 ('DDR4') bus. Although the storage array controller (202) detailed in FIG. 2 includes only a single computer processor, however, readers will appreciate that storage array controllers useful in accumulating application-level statistics in a storage system that includes a plurality of block storage devices according to embodiments of the present disclosure may include additional computer processors. Likewise, although the storage array controller (202) detailed in FIG. 2 includes only a RAM (244), readers will appreciate that storage array controllers useful in accumulating application-level statistics in a storage system that includes a plurality of block storage devices according to embodiments of the present disclosure may include additional forms of computer memory such as flash memory.

The storage array controller (202) detailed in FIG. 2 includes an operating system (246) that is stored in RAM (246). Examples of operating systems useful in storage array controllers (202, 206) configured for accumulating application-level statistics in a storage system that includes a plurality of block storage devices according to embodiments of the present disclosure include UNIX™, Linux™, Microsoft Windows™, and others as will occur to those of skill in the art. The operating system (246) depicted in FIG. 2 may be embodied, for example, as system software that manages computer hardware and software resources on the storage array controller (202).

The storage array controller (202) detailed in FIG. 2 also includes an array operating environment (252) that is stored in RAM (252). The array operating environment (252) may be embodied as one or more modules of computer program instructions used to enable the storage array controller (202) to service access requests that are directed to the storage array (220). The array operating environment (252) may be responsible for generating I/O requests (e.g., read requests, write requests) that are sent to the storage devices (216) or the write buffer devices (218). The array operating environment (252) may be further configured to perform various functions that result in more efficient utilization of the resources within the storage array (220). The array operating environment (252) may be configured, for example, to compress data prior to writing the data to one of the storage devices (216), to perform data deduplication operations, to pool data that is to be written to one of the storage devices (216) so that data may be written in blocks of a predetermined size, and so on.

The storage array controller (202) detailed in FIG. 2 also includes a statistics module (256), a module that includes computer program instructions useful in accumulating application-level statistics in a storage system that includes a plurality of block storage devices according to embodiments of the present disclosure. The statistics module (256) may be useful in accumulating application-level statistics in a storage system that includes a plurality of block storage devices by identifying, from data stored on a block storage device, one or more sub-regions of the data stored on the block storage device that are associated with an application and compiling, from statistics maintained for each of the one or more sub-regions of the stored data associated with the application, cumulative statistics for the application. The statistics module (256) may identify one or more sub-regions of the data stored on the block storage device that are associated with an application by: identifying, from the data stored on the block storage device, one or more application related components stored on the block storage device and identifying, in dependence upon the one or more application related components stored on the block storage device and an application profile that includes information identifying one or more components of the application, one or more sub-regions of the data stored on the block storage device that are associated with the application. Alternatively, the statistics module (256) may identify one or more sub-regions of the data stored on the block storage device that are associated with an application by: selecting a known application type, reading a portion of the one or more sub-regions of the data, and determining, in dependence upon the data contained in the portion of the one or more sub-regions, whether the one or more sub-regions are associated with the known application type. Alternatively, the statistics module (256) may identify one or more sub-regions of the data stored on the block storage device that are associated with an application by identifying, from a snapshot of at least a portion of the data stored on the block storage device, one or more sub-regions of the data stored on the block storage device that are associated with the application. The statistics module (256) may compile cumulative statistics for the application by updating cumulative statistics for the application in response to one or more of the sub-regions of the stored data associated with the application being accessed. The statistics module (256) may also receive a request for cumulative statistics for the application as well as present, to a user of the storage system, the cumulative statistics for the application. The statistics module (256) may also detect that a storage system objective was not satisfied and identify, in dependence upon cumulative statistics for a plurality of applications, an application that most significantly contributed to not satisfying the storage system objective. The statistics module (256) may also track historical cumulative statistics for the application and determine, in dependence upon the historical cumulative statistics for the application and the cumulative statistics for the application, whether a deviation threshold has been met. The statistics modules (256) may also project, in dependence upon the historical cumulative statistics for the application and the cumulative statistics for the application, future cumulative statistics for the application, as well as perform other tasks as will be described in greater detail below.

The storage array controller (202) detailed in FIG. 2 also includes a plurality of host bus adapters (222, 224, 250) and Ethernet adapters (226, 228) that are coupled to the computer processor (240) via a data communications link (230, 232, 234, 236, 258). Each host bus adapter (222, 224, 250) and Ethernet adapter (226, 228) may be embodied as a module of computer hardware that connects the host system (i.e., the storage array controller) to other network and storage devices. Each of the host bus adapters (222, 224, 250) of FIG. 2 may be embodied, for example, as a Fibre Channel adapter that enables the storage array controller (202) to connect to a SAN, as a Target Channel Adapter, as a SCSI/Storage Target Adapter, and so on. Each Ethernet adapter (226, 228) may enable the storage array controller (202) to connect to a LAN or other data communications network. Each of the host bus adapters (222, 224, 250) may be coupled to the computer processor (240) via a data communications link (230, 232, 234, 236, 258) such as, for example, a PCIe bus.

The storage array controller (202) detailed in FIG. 2 also includes a switch (254) that is coupled to the computer processor (240) via a data communications link (248). The switch (254) of FIG. 2 may be embodied as a computer hardware device that can create multiple endpoints out of a single endpoint, thereby enabling multiple devices to share what was initially a single endpoint. The switch (254) of FIG. 2 may be embodied, for example, as a PCIe switch that is coupled to a PCIe bus and presents multiple PCIe connection points to the midplane (210).

The storage array controller (202) of FIG. 2 may also include a data communications link (242) for coupling the storage array controller (202) to other storage array controllers (206). Such a data communications link (242) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
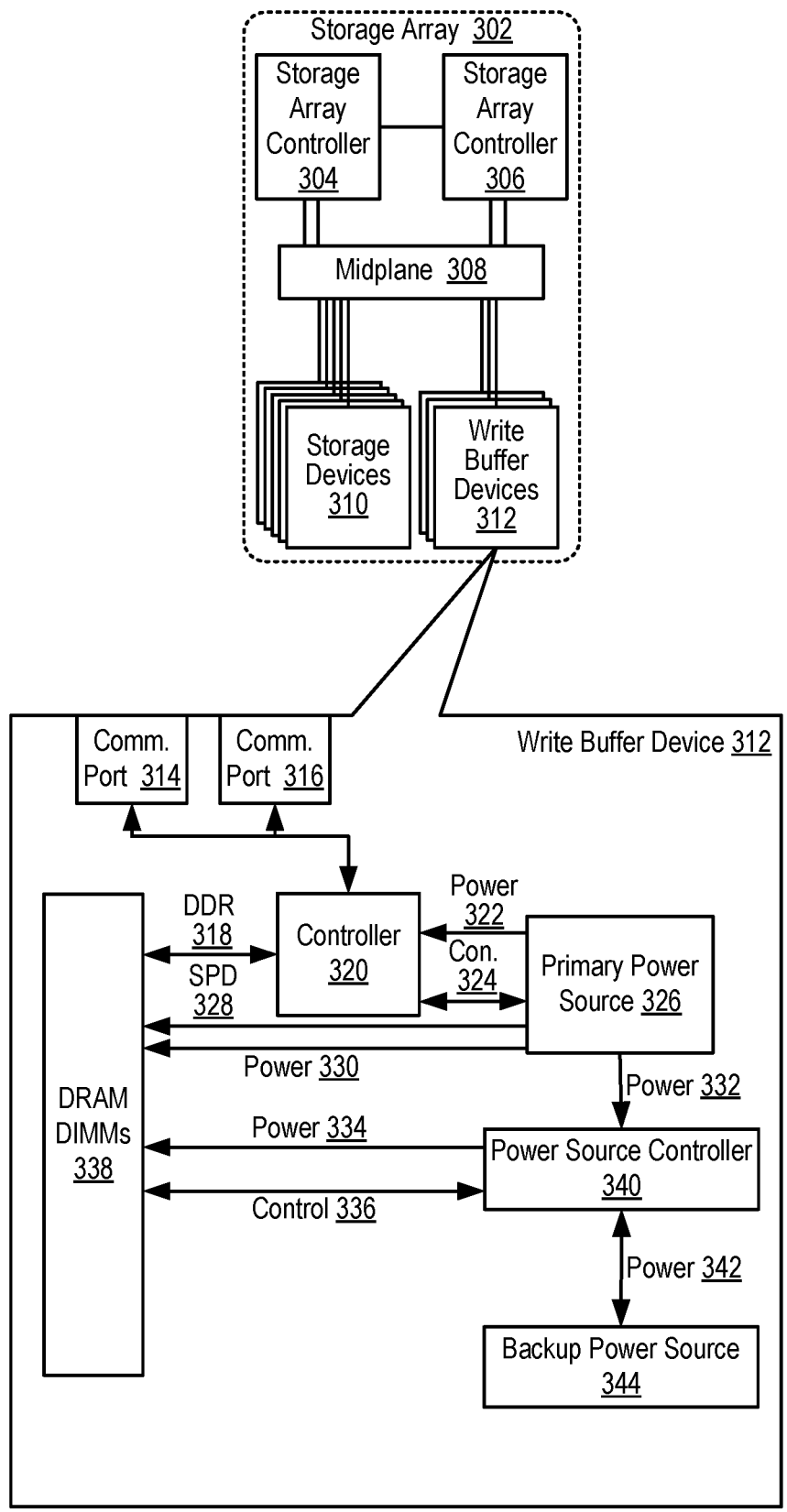
FIG. 3 sets forth a block diagram of a storage system configured for accumulating application-level statistics in a storage system that includes a plurality of block storage devices according to embodiments of the present disclosure.

For further explanation, FIG. 3 sets forth a block diagram illustrating a write buffer device (312) useful in accumulating application-level statistics in a storage system that includes a plurality of block storage devices according to embodiments of the present disclosure. The write buffer device (312) depicted in FIG. 3 is similar to the write buffer devices depicted in FIG. 1 and FIG. 2. The write buffer device (312) may be included in a storage array (302) that includes a plurality of storage array controllers (304, 306) that are communicatively coupled to a plurality of storage devices (310) and also communicatively coupled to a plurality of write buffer devices (312) via a midplane (308).

The write buffer device (312) depicted in FIG. 3 includes two data communications ports (314, 316). The data communications ports (314, 316) of FIG. 3 may be embodied, for example, as computer hardware for communicatively coupling the write buffer device (312) to a storage array controller (304, 306) via the midplane (308). For example, the write buffer device (312) may be communicatively coupled to the first storage array controller (304) via a first data communications port (314) and the write buffer device (312) may also be communicatively coupled to the second storage array controller (306) via a second data communications port (316). Although the write buffer device (312) depicted in FIG. 3 includes two data communications ports (314, 316), readers will appreciate that write buffer devices useful for buffering data to be written to an array of non-volatile storage devices may include only one data communications port or, alternatively, additional data communications ports not depicted in FIG. 3.

The write buffer device (312) depicted in FIG. 3 also includes a controller (320). The controller (320) depicted in FIG. 3 may be embodied, for example, as computer hardware for receiving memory access requests (e.g., a request to write data to memory in the write buffer device) via the data communications ports (314, 316) and servicing such memory access requests. The controller (320) depicted in FIG. 3 may be embodied, for example, as an ASIC, as a microcontroller, and so on. The controller (320) depicted in FIG. 3 may be communicatively coupled the data communications ports (314, 316), for example, via a PCIe data communications bus.

The write buffer device (312) depicted in FIG. 3 also includes a plurality of DRAM memory modules, embodied in FIG. 3 as DRAM dual in-line memory modules ('DIMMs') (338). The DRAM DIMMs (338) depicted in FIG. 3 may be coupled to the controller (320) via a memory bus such as a DDR (318) memory bus such that the controller (320) can be configured to write data to the DRAM DIMMs (338) via the DDR (318) memory bus.

The write buffer device (312) depicted in FIG. 3 also includes a primary power source (326). The primary power source (326) may be embodied as computer hardware for providing electrical power to the computing components that are within the write buffer device (312). The primary power source (326) may be embodied, for example, as a switched-mode power supply that supplies electric energy to an electrical load by converting alternating current ('AC') power from a mains supply to a direct current ('DC') power, as a DC-to-DC converter that converts a source of DC from one voltage level to another, and so on. The primary power source (326) of FIG. 3 is coupled to the controller (320) via a power line (322) that the primary power source (326) can use to deliver power to the controller (320). The primary power source (326) of FIG. 3 is also coupled to the DRAM DIMMs (338) via a power line (330) that the primary power source (326) can use to deliver power to the DRAM DIMMs (338). The primary power source (326) of FIG. 3 is also coupled to a power source controller (340) via a power line (332) that the primary power source (326) can use to deliver power to the power source controller (340). The primary power source (326) can monitor which components are receiving power through the use of one or more control lines (324), serial presence detect ('SPD') lines (328), or other mechanism for detecting the presence of a device and detecting that power is being provided to the device. Readers will appreciate that write devices useful for buffering data to be written to an array of non-volatile storage devices may include additional computing components not depicted in FIG. 3, each of which may also receive power from the primary power source (326).

The write buffer device (312) depicted in FIG. 3 also includes a backup power source (344). The backup power source (344) depicted in FIG. 3 represents a power source capable of providing power to the DRAM DIMMs (338) in the event that the primary power source (326) fails. In such a way, the DRAM DIMMs (338) may effectively serve as non-volatile memory, as a failure of the primary power source (326) will not cause the contents of the DRAM DIMMs (338) to be lost because the DRAM DIMMs (338) will continue to receive power from the backup power source (344). Such a backup power source (344) may be embodied, for example, as a supercapacitor.

The write buffer device (312) depicted in FIG. 3 also includes a power source controller (340). The power source controller (340) depicted in FIG. 3 may be embodied as a module of computer hardware configured to identify a failure of the primary power source (326) and to cause power to be delivered to the DRAM DIMMs (338) from the backup power source (344). In such an example, power may be delivered to the DRAM DIMMs (338) from the backup power source (344) via a first power line (342) between the power source controller (340) and the backup power source (344), as well as a second power line (334) between the backup power source controller (340) and the DRAM DIMMs (338). The backup power source controller (340) depicted in FIG. 3 may be embodied, for example, as an analog circuit, an ASIC, a microcontroller, and so on. The power source controller (340) can monitor whether the DRAM DIMMs (338) have power through the use of one or more control lines (336) that may be coupled to the DRAM DIMMs (338), as well as one or more control lines that may be coupled to the primary power source (326). In such an example, by exchanging signals between the DRAM DIMMs (338), the primary power source (326), and the power source controller (340), the power source controller (340) may identify whether power is being provided to the DRAM DIMMs (338) by the primary power source (326).

In the example depicted in FIG. 3, the controller (320) may be configured to receive, from a storage array controller (304, 306) via the one or more data communications ports (314, 316), an instruction to write data to the one or more DRAM DIMMs (338). Such an instruction may include, for example, the location at which to write the data, the data to be written to the DRAM DIMMs (338), the identity of the host that issued the instruction, the identity of a user associated with the instruction, or any other information needed to service the instruction. In the example depicted in FIG. 3, the NVRAM controller (320) may be further configured to write the data to the one or more DRAM DIMMs (338) in response to receiving such an instruction.

In the example depicted in FIG. 3, the controller (320) may be further configured to send an acknowledgment indicating that the data has been written to the array (302) of non-volatile storage devices in response to writing the data to the one or more DRAM DIMMs (338). The controller (320) may send the acknowledgment indicating that the data has been written to the array (302) of non-volatile storage devices in response to writing the data to the DRAM DIMMs (338) in the write buffer device (312). Readers will appreciate that although some forms of DRAM DIMMs (338) are considered to be volatile memory, because the DRAM DIMMs (338) are backed by redundant power sources (326, 344), writing the data to the DRAM DIMMs (338) in the write buffer device (312) may be treated the same as writing the data to traditional forms of non-volatile memory such as the storage devices (310). Furthermore, the DRAM DIMMs (338) in the write buffer device (312) can include one or more NVDIMMs. As such, once the data has been written to the DRAM DIMMs (338) in the write buffer device (312), an acknowledgement may be sent indicating that the data has been safely and persistently written to the array (302) of non-volatile storage devices.

In the example depicted in FIG. 3, the controller (320) may be further configured to determine whether the primary power source (326) has failed. The controller (320) may determine whether the primary power source (326) has failed, for example, by receiving a signal over the control line (324) indicating that the primary power source (326) has failed or is failing, by detecting a lack of power from the primary power source (326), and so on. In such an example, the controller (320) may be coupled to the backup power source (344) or may have access to another source of power such that the controller (320) can remain operational if the primary power source (326) does fail.

In the example depicted in FIG. 3, the controller (320) may be further configured to initiate a transfer of data contained in the one or more DRAM DIMMs (338) to flash memory in the write buffer device (312) in response to determining that the primary power source (326) has failed. The controller (320) may initiate a transfer of data contained in the one or more DRAM DIMMs (338) to flash memory in the write buffer device (312), for example, by signaling an NVDIMM to write the data contained in the one or more DRAM DIMMs (338) to flash memory on the NVDIMM.

Readers will appreciate that the storage systems and the components that are contained in such storage systems, as described in the present disclosure, are included for explanatory purposes and do not represent limitations as to the types of systems that may accumulate application-level statistics. In fact, storage systems configured for accumulating application-level statistics may be embodied in many other ways and may include fewer, additional, or different components. For example, storage within storage systems configured for accumulating application-level statistics may be embodied as block storage where data is stored in blocks, and each block essentially acts as an individual hard drive. Alternatively, storage within storage systems configured for accumulating application-level statistics may be embodied as object storage, where data is managed as objects. Each object may include the data itself, a variable amount of metadata, and a globally unique identifier, where object storage can be implemented at multiple levels (e.g., device level, system level, interface level). In addition, storage within storage systems configured for accumulating application-level statistics may be embodied as file storage in which data is stored in a hierarchical structure. Such data may be saved in files and folders, and presented to both the system storing it and the system retrieving it in the same format. Such data may be accessed using the Network File System ('NFS') protocol for Unix or Linux, Server Message Block ('SMB') protocol for Microsoft Windows, or in some other manner.

Figure 4:
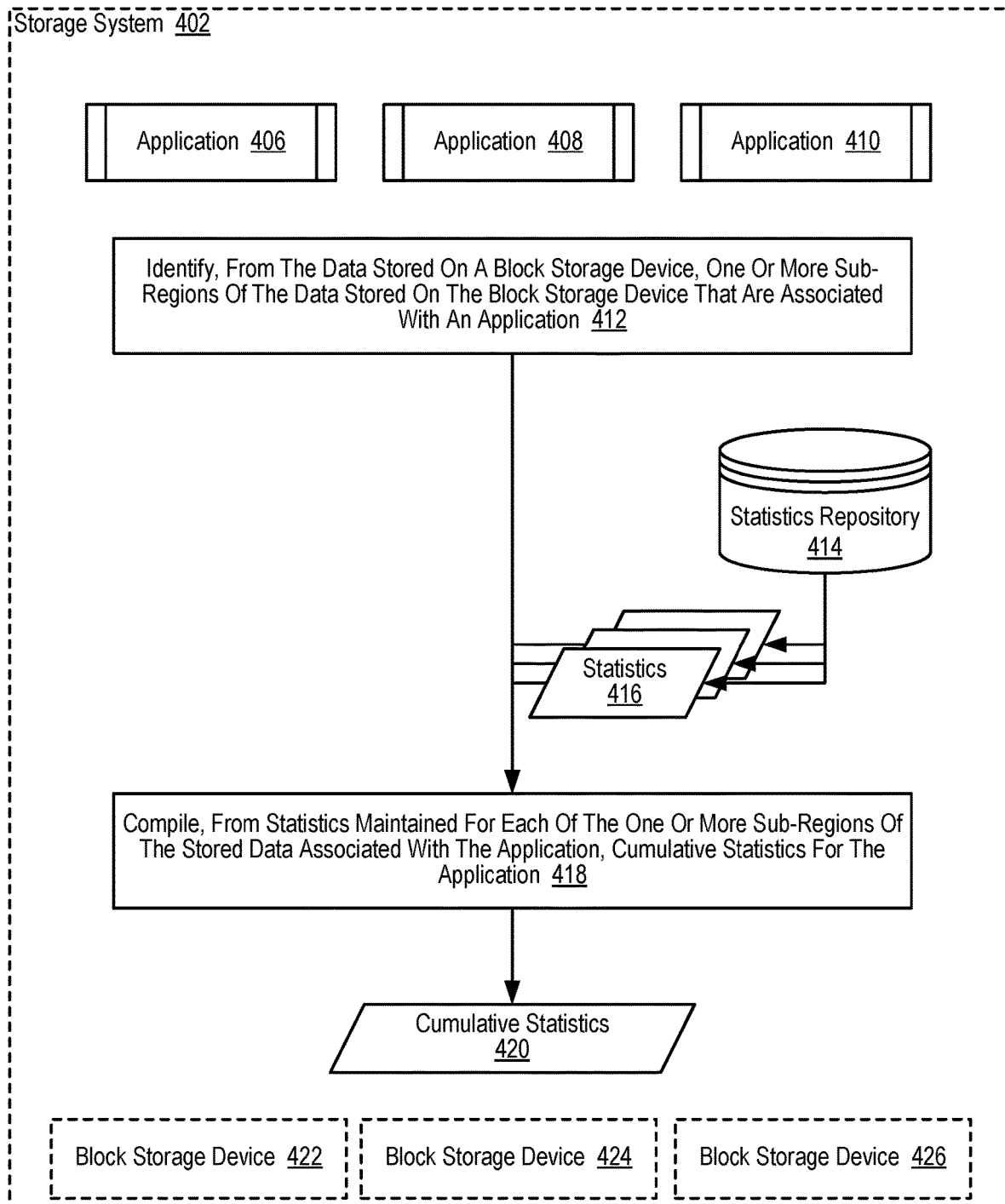
FIG. 4 sets forth a flow chart illustrating an example method for accumulating application-level statistics in a storage system that includes a plurality of block storage devices according to embodiments of the present disclosure.

For further explanation, FIG. 4 sets forth a flow chart illustrating an example method for accumulating application-level statistics in a storage system (402) that includes a plurality of block storage devices (422, 424, 426) according to embodiments of the present disclosure. In the example method depicted in FIG. 4, accumulating application-level statistics a storage system (402) that includes a plurality of block storage devices (422, 424, 426) may be carried out, for example, by one more modules of computer program instructions executing on computer hardware such as one or more CPUs. The one or more CPUs may be included in a storage array controller such as the storage array controllers described above with reference to FIGS. 1-3 or in some other computing device. The block storage devices (422, 424, 426) of FIG. 4 may be embodied, for example, as solid-state drives ('SSDs') where data is stored across one or more blocks of storage within one or more of the SSDs. In alternative embodiments, the block storage devices (422, 424, 426) may be embodied as other types of storage devices that operate as if they were block storage devices.

The example method depicted in FIG. 4 includes identifying (412), from data stored on a block storage device (422, 424, 426), one or more sub-regions of the data stored on the block storage device that are associated with an application (406, 408, 410). The applications (406, 408, 410) depicted in FIG. 4 may be embodied, for example, as a file system, a file system's use classes (e.g., home/build file systems), operating system defined elements (e.g., partitions, boot file systems and images, paging space), and virtual machine images and image stores possibly grouped by virtual machine image type or by base gold image, and many others.

In the example method depicted in FIG. 4, each sub-region of the data that is stored on the block storage device (422, 424, 426) may be embodied, for example, as a portion of a logical volume of data that is stored across one or more blocks of storage within one or more of the block storage devices (422, 424, 426). In such an example, a sub-region of the data may be associated with a particular application (406, 408, 410) when, for example, the particular application (406, 408, 410) requested that the data be written to the block storage device (422, 424, 426). Readers will appreciate that data may be associated with a particular application (406, 408, 410) when executing the particular application (406, 408, 410) causes data to be written to the block storage device (422, 424, 426). Executing the particular application (406, 408, 410) may cause data to be written to the block storage device (422, 424, 426), for example, when the particular application (406, 408, 410) issues one or more requests to write data to the storage system (402), when a system management module or other module issues one or more requests to write metadata associated with the particular application (406, 408, 410) to the storage system (402), when a system management module or other module replicates data associated with the particular application (406, 408, 410) to the storage system (402), when a system management module or other module creates a snapshot of data associated with the particular application (406, 408, 410), and so on. As such, readers will appreciate that data may be associated with a particular application (406, 408, 410) in situations other than when data is written to the storage system (402) at the behest of the particular application (406, 408, 410). Readers will further appreciate that one or more regions of the volume that contain data associated with the particular application (406, 408, 410) may be identified (412) for many types of applications. For example, the application (406, 408, 410) may be a user-level application, the application (406, 408, 410) may be a system-level application, and so on.

In the example method depicted in FIG. 4, identifying (412) one or more sub-regions of the data stored on the block storage device that are associated with an application (406, 408, 410) from data stored on a block storage device (422, 424, 426) may be carried out, for example, by reading the data stored on the block storage device (422, 424, 426), possibly from a stable snapshot, and looking for common headers representing partition tables (e.g., Windows master boot record ('MBR'), EFI partitions including EFI system partitions, volume managers or aggregating file systems (e.g., Logical Volume Management ('LVM'), Veritas Volume Manager ('VxVM'), VMWARE Virtual Volumes ('vVOLs'), Oracle Automatic Storage Management ('ASM'), Sun Microsystems Z File System ('ZFS')), and so on. In such an example, the common headers representing partition tables, volume managers, or aggregating file systems may be deconstructed to look for interesting contained objects such as virtual machine images, chained virtual machine image snapshots, file system subtrees, database structures, and so on. Host-side tools may also be run that can map from known host-side information, which can include knowledge of file systems, volume managers, virtual machine libraries, databases, and that can use host-side configuration information to decompose readily understood structures which are commonly used in servers to construct or contain applications, and use those to relate such application constructions and containers either to particular maps of blocks in a storage device, or to particular structures that can be detected by format scanners in a storage device.

The example method depicted in FIG. 4 also includes compiling (418), from statistics (416) maintained for each of the one or more sub-regions of the stored data associated with the application (406, 408, 410), cumulative statistics (420) for the application (406, 408, 410). The statistics (416) maintained for each of the one or more sub-regions of the stored data may be part of a larger set of statistics maintained by an entity such as, for example, the array operating environment described above with reference to FIG. 2, one or more of the block storage devices (422, 424, 426) themselves, and so on. In such an example, statistics for each portion of an address space may be gathered and retained as various tasks are carried out such as servicing I/O requests, performing various system-level tasks (e.g., servicing a read operation directed to one of the sub-regions, servicing a write operation directed to one of the sub-regions, performing a replication process, performing a garbage collection process), and so on. Examples of statistics that may be gathered and retained may include calculations of space consumption that account for thin provisioning, compression, and deduplication, snapshot overwrite rates, total data transfer, and many others. Such statistics may be retained, for example, in a statistics repository (414) that is maintained in memory of a storage controller, in a statistics repository that is committed to persistent storage on one or more of the block storage devices (422, 424, 426), in memory of persistent storage on another part of the storage system (402) or in a separate storage system, or any combination thereof. In the example method depicted in FIG. 4, statistics (416) maintained for each of the one or more sub-regions of the stored data associated with a particular application (406, 408, 410) may be extracted from the statistics for each portion of an address space by identifying the portion of the address space that corresponds to the one or more sub-regions of the stored data associated with a particular application (406, 408, 410). In the example method depicted in FIG. 4, compiling (418) cumulative statistics (420) for the particular application (406, 408, 410) may be carried out, for example, by summing up the statistics (416) maintained for each of the one or more sub-regions of the stored data that are associated with the application (406, 408, 410).

Figure 5:
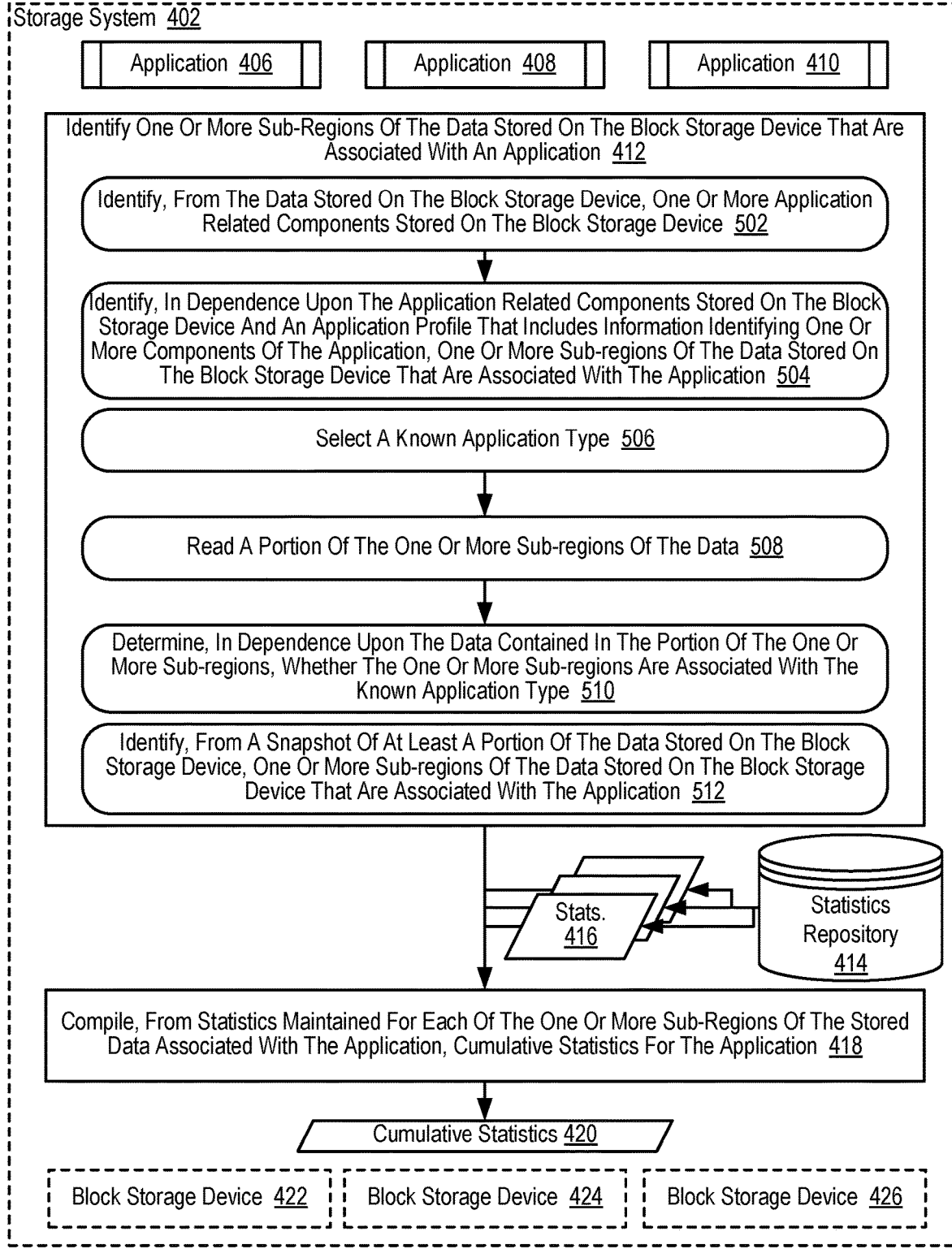
FIG. 5 sets forth an additional flow chart illustrating an example method for accumulating application-level statistics in a storage system that includes a plurality of block storage devices according to embodiments of the present disclosure.

For further explanation, FIG. 5 sets forth a flow chart illustrating an additional example method for accumulating application-level statistics in a storage system that includes a plurality of block storage devices according to embodiments of the present disclosure. The example method depicted in FIG. 5 is similar to the example method depicted in FIG. 4, as the example method depicted in FIG. 5 also includes identifying (412), from data stored on a block storage device (422, 424, 426), one or more sub-regions of the data stored on the block storage device that are associated with an application (406, 408, 410) and compiling (418), from statistics (416) maintained for each of the one or more sub-regions of the stored data associated with the application (406, 408, 410), cumulative statistics (420) for the application (406, 408, 410).

In the example method depicted in FIG. 5, identifying (412) one or more sub-regions of the data stored on the block storage device that are associated with an application (406, 408, 410) can include identifying (502), from the data stored on the block storage device (422, 424, 426), one or more application related components stored on the block storage device (422, 424, 426). Identifying (502) one or more application related components stored on the block storage device (422, 424, 426) from the data stored on the block storage device (422, 424, 426) may be carried out, for example, by reading the data stored on the block storage device (422, 424, 426) and looking for format headers or other metadata that is included in the data to identify one or more common components of various types of applications or common components that are known to be used by various types of applications.

In the example method depicted in FIG. 5, identifying (412) one or more sub-regions of the data stored on the block storage device that are associated with an application (406, 408, 410) can also include identifying (504), in dependence upon the one or more application related components stored on the block storage device (422, 424, 426) and an application profile that includes information identifying one or more components of the application (406, 408, 410), one or more sub-regions of the data stored on the block storage device (422, 424, 426) that are associated with the application (406, 408, 410). The application profiles may be maintained by the storage system and may include information that identifies one or more components of the application (406, 408, 410).

Consider an example in which a first portion of the data stored on the block storage device (422, 424, 426) is read and format headers or other metadata is identified which indicates that the first portion of the data stored on the block storage device (422, 424, 426) is a virtual machine image. Likewise, assume that a second portion of the data stored on the block storage device (422, 424, 426) is read and format headers or other metadata is identified that indicates that the second portion of the data stored on the block storage device (422, 424, 426) is a virtual machine file system. In such an example, application profiles for one or more applications may be examined to identify applications that are known to both: 1) run in a virtual machine, and 2) utilize a virtual machine file system. In such a way, application profiles may be used to identify the component parts of an application, the data stored on the block storage devices (422, 424, 426) may be examined to identify component parts of applications that are stored on the block storage devices (422, 424, 426), and such information may be combined to provide an indication of the applications that are executing on the storage system (402).

In the example method depicted in FIG. 5, identifying (412) one or more sub-regions of the data stored on the block storage device (422, 424, 426) that are associated with an application (406, 408, 410) can also include selecting (506)

a known application type. Selecting (506) a known application type may be carried out, for example, by selecting an application type that is known to commonly execute on the storage system (402). In such a way, selecting (506) a known application type may allow the storage system (402) to speculate as to which application is associated with the one or more sub-regions of the data stored on the block storage device (422, 424, 426).

In the example method depicted in FIG. 5, identifying (412) one or more sub-regions of the data stored on the block storage device (422, 424, 426) that are associated with an application (406, 408, 410) can also include reading (508) a portion of the one or more sub-regions of the data stored on the block storage device (422, 424, 426). The size of the portion of the one or more sub-regions of the data stored on the block storage device (422, 424, 426) that is read (508) may be set a system parameter, established by a system administrator, set to a value that is specific to the particular application type that was selected (506), or established in other ways. In such an example, by reading (508) only a portion of the one or more sub-regions rather than reading all data contained in the one or more sub-regions, the storage system (402) may identify (412) one or more sub-regions of the data stored on the block storage device (422, 424, 426) that are associated with an application (406, 408, 410) in a more efficient manner as system resources do not have to be dedicated to reading all data contained in the one or more sub-regions. Readers will further appreciate that reading (508) a portion of the one or more sub-regions of the data stored on the block storage device (422, 424, 426) may be carried out, for example, by reading the portion of the one or more sub-regions from live data stored on the block storage devices (422, 424, 426), by reading the portion of the one or more sub-regions from a snapshot that is stored on the block storage devices (422, 424, 426), and so on.

In the example method depicted in FIG. 5, identifying (412) one or more sub-regions of the data stored on the block storage device (422, 424, 426) that are associated with an application (406, 408, 410) can also include determining (510) whether the content of the portion of the one or more sub-regions of the data stored on the block storage device (422, 424, 426) matches the selected application type. Determining (510) whether the content of the portion of the one or more sub-regions of the data stored on the block storage device (422, 424, 426) matches the selected application type may be carried out, for example, by looking for format headers or other metadata that is included in the content of the portion of the one or more sub-regions to identify one or more common components of the selected application type or common components that are known to be used by the selected application type. In such an example, if the content of the portion of the one or more sub-regions matches the selected application type, the storage system (402) may identify the particular instance of the selected application type that is associated with the one or more sub-regions and may associate the entire one or more sub-regions of the data stored on the block storage device (422, 424, 426) with the particular instance of the selected application type. If the content of the portion of the one or more sub-regions does not match the selected application type, however, the storage system (402) may proceed by selecting (506) a different known application type and performing the steps described above until a match is identified.

In the example method depicted in FIG. 5, identifying (412) one or more sub-regions of the data stored on the block storage device (422, 424, 426) that are associated with an application (406, 408, 410) can also include identifying (512), from a snapshot of at least a portion of the data stored on the block storage device (422, 424, 426), one or more sub-regions of the data stored on the block storage device (422, 424, 426) that are associated with the application (406, 408, 410). The snapshot of at least a portion of the data stored on the block storage device (422, 424, 426) may be embodied, for example, as a read-only image of at least a portion of the data that is stored within the storage system (402) at a point in time. A snapshot may capture, for example, the data that is stored within a particular volume within the storage system (402) at a point in time, the data that is stored within a particular range of addresses within the storage system (402) at a point in time, the data that is stored within a particular logical or physical entity within the storage system (402) at a point in time, and so on.

Readers will appreciate that by identifying (512) one or more sub-regions of the data that are associated with the application (406, 408, 410) from a snapshot, the storage system (402) may use historical data (rather than live data currently stored on the block storage devices (422, 424, 426)) when identifying (412) one or more sub-regions of the data stored on the block storage device that are associated with an application (406, 408, 410). Through the use of historical data rather than live data currently stored on the block storage devices (422, 424, 426), stable data (i.e., a stable snapshot whose content will not change) is examined, rather than using live data that is subject to change (e.g., changing metadata structures that can confuse the reading of a complex format). Readers will appreciate that in alternative embodiments, identifying (412) one or more sub-regions of the data stored on the block storage device (422, 424, 426) that are associated with an application (406, 408, 410) may be carried out by examining live data that is currently stored on the block storage devices (422, 424, 426) rather than examining the contents of snapshots.

Figure 6:
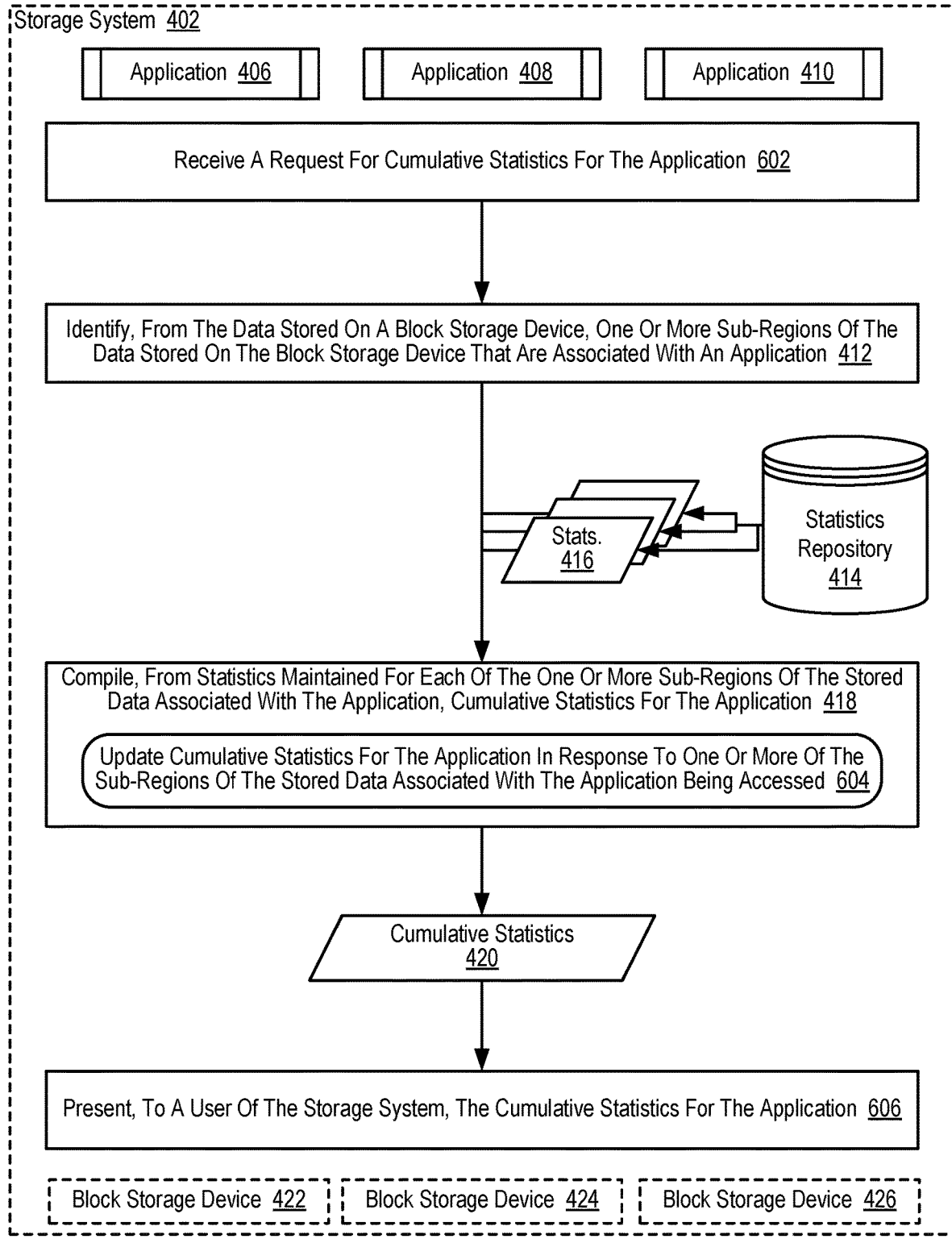
FIG. 6 sets forth an additional flow chart illustrating an example method for accumulating application-level statistics in a storage system that includes a plurality of block storage devices according to embodiments of the present disclosure.

For further explanation, FIG. 6 sets forth a flow chart illustrating an additional example method for accumulating application-level statistics in a storage system that includes a plurality of block storage devices according to embodiments of the present disclosure. The example method depicted in FIG. 6 is similar to the example method depicted in FIG. 4, as the example method depicted in FIG. 6 also includes identifying (412), from data stored on a block storage device (422, 424, 426), one or more sub-regions of the data stored on the block storage device that are associated with an application (406, 408, 410) and compiling (418), from statistics (416) maintained for each of the one or more sub-regions of the stored data associated with the application (406, 408, 410), cumulative statistics (420) for the application (406, 408, 410).

The example method depicted in FIG. 6 also includes receiving (602) a request for cumulative statistics for the application (406, 408, 410). The request for cumulative statistics for the application (406, 408, 410) may be received (602), for example, from a system-level entity such as a reporting module configured to report various aspects of system utilization back to a user, from a user of the storage system (402) via a user interface, and so on. In such an example, the request for cumulative statistics for the application (406, 408, 410) may include information such as an identifier of the particular application (406, 408, 410) that cumulative statistics, information identifying specific statistics that are requested, and so on.

In the example method depicted in FIG. 6, compiling (418), from statistics (416) maintained for each of the one or more sub-regions of the stored data associated with the application (406, 408, 410), cumulative statistics (420) for the application (406, 408, 410) can include updating (604) cumulative statistics (420) for the application (406, 408, 410) in response to one or more of the sub-regions of the stored data associated with the application (406, 408, 410) being accessed. The one or more sub-regions of the stored data associated with the application (406, 408, 410) may be accessed, for example, as the result of a read operation directed to one of the sub-regions, as the result of a write operation directed to one of the sub-regions, as the result of a replication process, as part of a garbage collection process, and so on. In such an example, accessing a particular sub-region can consume system resources and, as such, the cumulative statistics (420) for the application (406, 408, 410) may need to be updated (604).

The example method depicted in FIG. 6 also includes presenting (606), to a user of the storage system (402), the cumulative statistics (420) for the application (406, 408, 410). Presenting (606) the cumulative statistics (420) for the application (406, 408, 410) to a user of the storage system (402) may be carried out, for example, through the use of a GUI that is used to display the cumulative statistics (420) for one or more applications (406, 408, 410), through the use of a report that includes the cumulative statistics (420) for one or more applications (406, 408, 410), where such a report is generated and sent to, or otherwise presented to, a user of the storage system (402), and in other ways.

Figure 7:
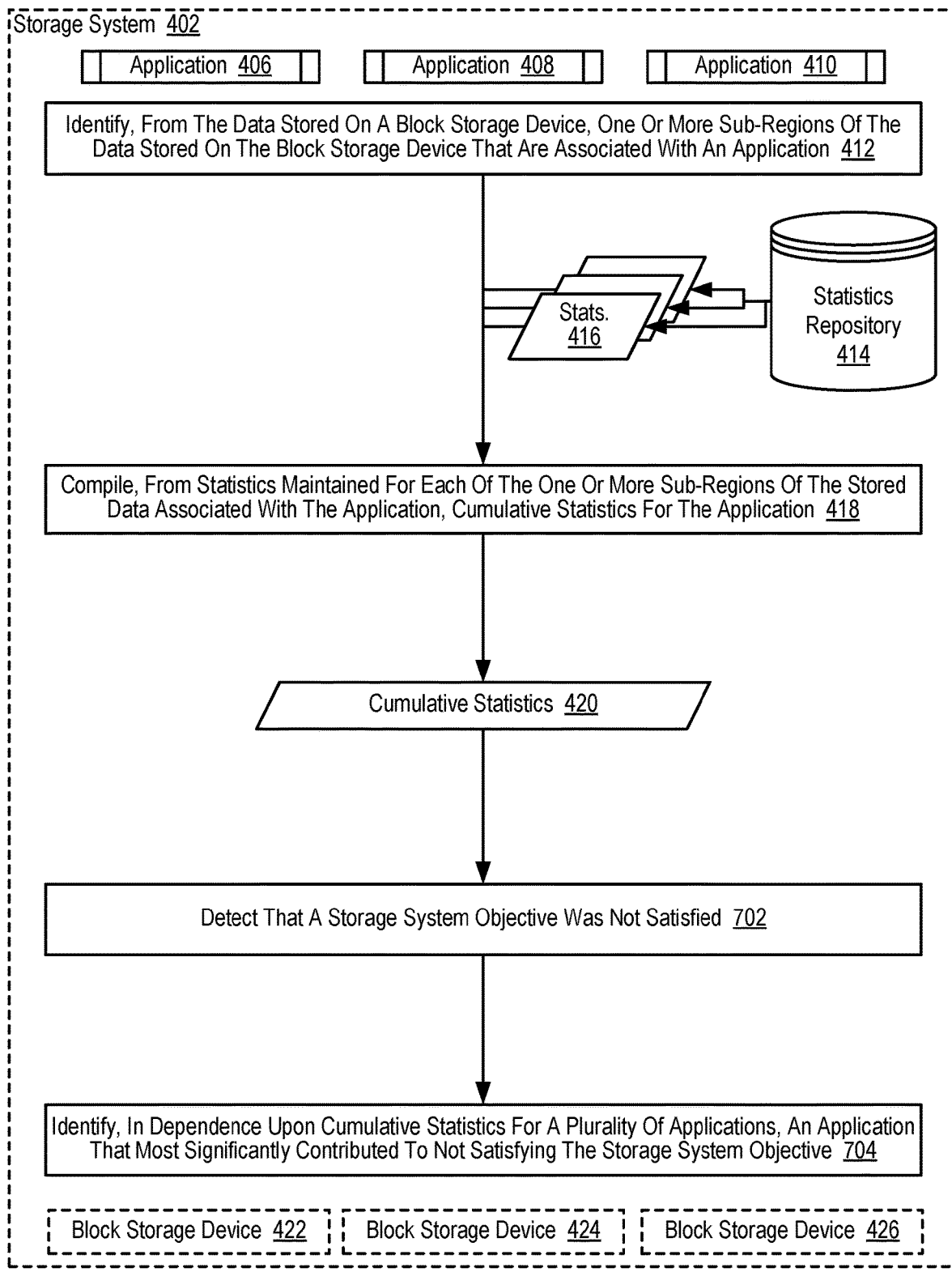
FIG. 7 sets forth an additional flow chart illustrating an example method for accumulating application-level statistics in a storage system that includes a plurality of block storage devices according to embodiments of the present disclosure.

For further explanation, FIG. 7 sets forth a flow chart illustrating an additional example method for accumulating application-level statistics in a storage system that includes a plurality of block storage devices according to embodiments of the present disclosure. The example method depicted in FIG. 7 is similar to the example method depicted in FIG. 4, as the example method depicted in FIG. 7 also includes identifying (412), from data stored on a block storage device (422, 424, 426), one or more sub-regions of the data stored on the block storage device that are associated with an application (406, 408, 410) and compiling (418), from statistics (416) maintained for each of the one or more sub-regions of the stored data associated with the application (406, 408, 410), cumulative statistics (420) for the application (406, 408, 410).

The example method depicted in FIG. 7 also includes detecting (702) that a storage system objective was not satisfied. The storage system objective may be embodied, for example, as a recovery point objective that specifies the age of data that must be recovered during data recovery operations, as a recovery time objective that specifies an amount of time within which data must be restored during data recovery operations, as an objective that specifies the amount of time within which data replication operations must be completed, and many others. In such a way, the storage system objective can specify one or more quantifiable targets for system performance. In the example method depicted in FIG. 7, detecting (702) that a storage system objective was not satisfied may be carried out by measuring quantifiable aspects of system performance and comparing such measured aspects of system performance to the quantifiable targets for system performance included in the storage system objective.

The example method depicted in FIG. 7 also includes identifying (704), in dependence upon cumulative statistics for a plurality of applications, an application that most significantly contributed to not satisfying the storage system objective. Identifying (704) an application that most significantly contributed to not satisfying the storage system objective in dependence upon cumulative statistics for a plurality of applications (406, 408, 410) may be carried out, for example, by identifying particular system resources whose scarcity contributed to not satisfying the storage system objective and identifying, from the cumulative statistics for a plurality of applications, the application that consumed the largest amount of such system resources.

Consider an example in which the storage system objective specifies an amount of time within which data replication operations must be completed. In such an example, assume that the storage system (402) has detected (702) that the storage system objective was not satisfied, as the amount of time that the storage system (402) required to complete data replication operations exceeded the amount of time within which data replication operations must be completed as specified in the storage system objective. In such an example, the amount of time that the storage system (402) required to complete data replication operations may have exceeded the amount of time within which data replication operations must be completed as specified in the storage system objective, for example, because insufficient processing resources were available to complete data replication operations within the amount of time specified in the storage system objective. In such an example, identifying (704) an application that most significantly contributed to not satisfying the storage system objective may be carried out, for example, by examining the cumulative statistics for a plurality of applications and identifying the application that consumed the largest amount of processing resources during the period in which the replication operations were being carried out.

Readers will appreciate that while the example depicted in FIG. 7 includes identifying (704) an application that most significantly contributed to not satisfying the storage system objective, other embodiments are within the scope of the present disclosure. For example, in alternative embodiments the storage system (402) may be configured to identify a plurality of applications that most significantly contributed to not satisfying the storage system objective, the storage system (402) may be configured to identify all applications that contributed to not satisfying the storage system objective, the storage system (402) may be configured to identify any applications that consumed more than a threshold level of system resources whose scarcity contributed to not satisfying the storage system objective, the storage system (402) may be configured to identify any applications that consumed any portion of system resources whose scarcity contributed to not satisfying the storage system objective, and so on. In view of the fact that the storage system (402) has identified which applications over-consumed system resources whose scarcity contributed to not satisfying the storage system objective or otherwise operated outside of specifications, the storage system (402) may be configured to use this information to take action by prioritizing some volumes over others, slowing down the receipt of some write operations, or some other action. Readers will appreciate that, in a similar fashion, the storage system (402) may be configured to detecting that a particular an application that has not met an objective and identify additional applications and storage system interactions that contributed to the application not meeting its objectives.

Figure 8:
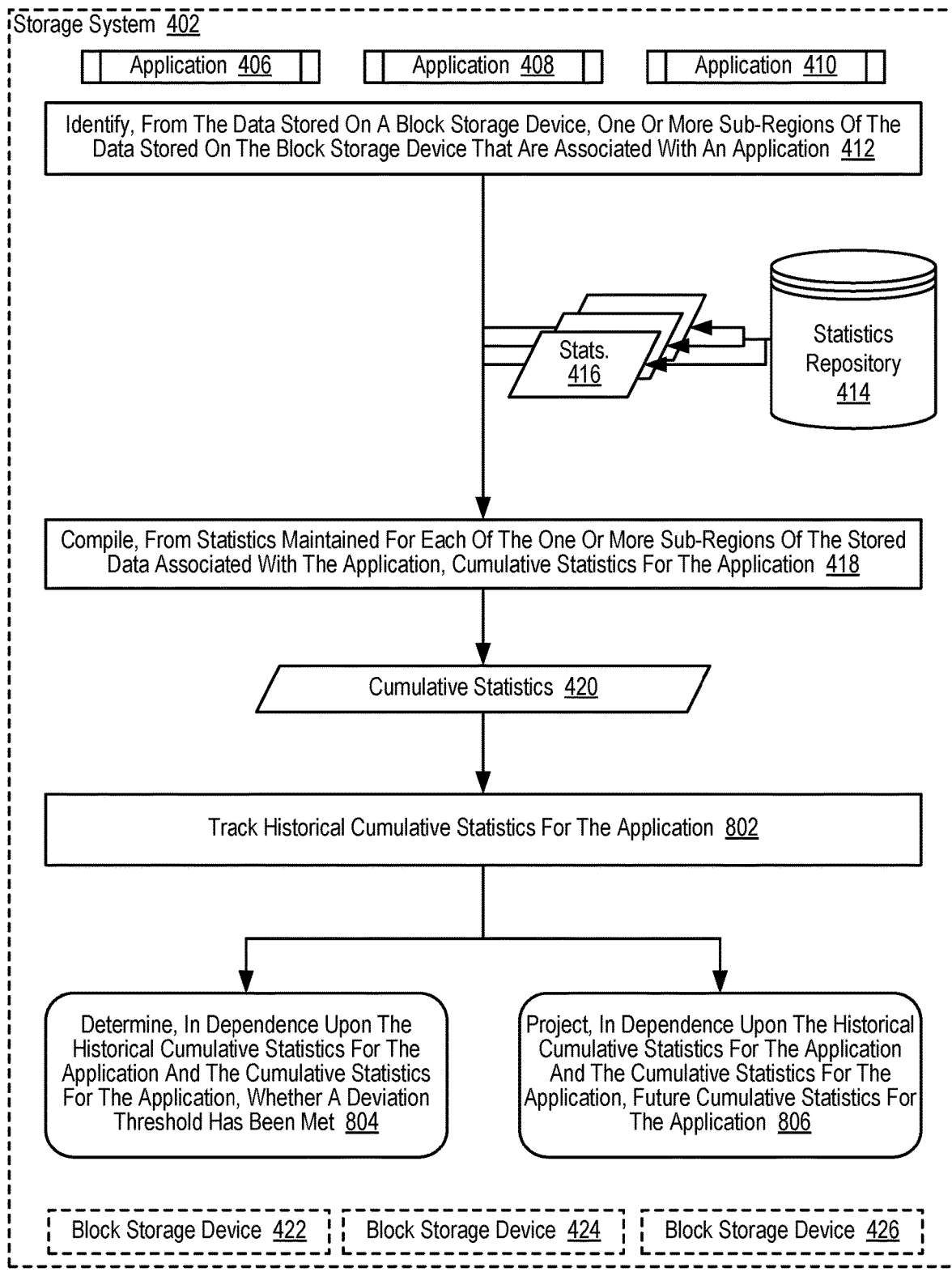
FIG. 8 sets forth an additional flow chart illustrating an example method for accumulating application-level statistics in a storage system that includes a plurality of block storage devices according to embodiments of the present disclosure.

For further explanation, FIG. 8 sets forth a flow chart illustrating an additional example method for accumulating application-level statistics in a storage system that includes a plurality of block storage devices according to embodiments of the present disclosure. The example method depicted in FIG. 8 is similar to the example method depicted in FIG. 4, as the example method depicted in FIG. 8 also includes identifying (412), from data stored on a block storage device (422, 424, 426), one or more sub-regions of the data stored on the block storage device that are associated with an application (406, 408, 410) and compiling (418), from statistics (416) maintained for each of the one or more sub-regions of the stored data associated with the application (406, 408, 410), cumulative statistics (420) for the application (406, 408, 410).

The example method depicted in FIG. 8 also includes tracking (802) historical cumulative statistics for the application (406, 408, 410). In the example method depicted in FIG. 8, tracking (802) historical cumulative statistics for the application (406, 408, 410) may be carried out, for example, by storing cumulative statistics (420) for each application (406, 408, 410) each time that such cumulative statistics (420) are generated. Each instance of the cumulative statistics (420) may be stored, for example, in a statistics repository such as a table, database, and so on. In the example method depicted in FIG. 8, a predetermined number of instances of the cumulative statistics (420) for a particular application (406, 408, 410) may be retained, instances of the cumulative statistics (420) for a particular application (406, 408, 410) that were generated within a predetermined period of time may be retained, and so on.

The example method depicted in FIG. 8 also includes determining (804), in dependence upon the historical cumulative statistics for the application (406, 408, 410) and the cumulative statistics for the application (406, 408, 410), whether a deviation threshold has been met. In the example method depicted in FIG. 8, the deviation threshold may be used to determine whether a particular application (406, 408, 410) is excessively deviating from its previous behavior. The deviation threshold may therefore include, for example, a percentage of processing resources that a particular application (406, 408, 410) may utilize in excess of its historical level of processing resource utilization without exceeding the deviation threshold, an amount of processing resources that a particular application (406, 408, 410) may utilize in excess of its historical level of processing resource utilization without exceeding the deviation threshold, a percentage of storage resources that a particular application (406, 408, 410) may utilize in excess of its historical level of storage resource utilization without exceeding the deviation threshold, an amount of storage resources that a particular application (406, 408, 410) may utilize in excess of its historical level of storage resource utilization without exceeding the deviation threshold, and many others. Determining (804) whether a deviation threshold has been met may be carried out, for example, by comparing information contained in the historical cumulative statistics for a particular application (406, 408, 410) to the cumulative statistics for the particular application (406, 408, 410), and determining whether the cumulative statistics for the particular application (406, 408, 410) deviate from the historical cumulative statistics for a particular application (406, 408, 410) by an amount that meets or exceeds the deviation threshold. In such an example, any deviation from the historical cumulative statistics for a particular application (406, 408, 410) that meets or exceeds the deviation threshold may be reported to a user such as a system administrator, reported to a system entity for evaluation and possible resolution, or result in one or more other actions being taken by the storage system (402).

The example method depicted in FIG. 8 also includes projecting (806), in dependence upon the historical cumulative statistics for the application (406, 408, 410) and the cumulative statistics for the application (406, 408, 410), future cumulative statistics for the application (406, 408, 410). Projecting (806) future cumulative statistics for the application may be carried out, for example, by examining the historical cumulative statistics for the application (406, 408, 410) and the cumulative statistics for the application (406, 408, 410) to determine the rate at which various quantifiable aspects of system performance are changing. In such an example, projecting (806) future cumulative statistics for the application (406, 408, 410) may be carried out by assuming that the cumulative statistics for the application (406, 408, 410) will continue to change at the same rate at which various quantifiable aspects of system performance have been changing in the past. Readers will appreciate that many other factors may also be taken into account such as, for example, periodic trends that can be used to identify heavier and lighter periods of system usage, expected increases or decreases to various system capabilities that can result from hardware and software upgrades, degradation of hardware components, and the like, as well as many other factors.

Readers will appreciate that the future cumulative statistics for the application (406, 408, 410) may be examined and compared against various thresholds to identify projected problems. The future cumulative statistics for the application (406, 408, 410) may be presented to a system administrator, system management module, or other entity that may take corrective actions to preempt the occurrence of a projected problem. Such corrective actions may include, for example, changing one or more application settings, moving one or more applications to a different storage system, ceasing execution of one or more applications, and so on.

Readers will appreciate that although the example methods described above are depicted in a way where a series of steps occurs in a particular order, no particular ordering of the steps is required unless explicitly stated. Example embodiments are described largely in the context of a fully functional computer system for accumulating application-level statistics in a storage system that includes a plurality of block storage devices. Readers of skill in the art will recognize, however, that embodiments of the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present disclosure. In fact, embodiments of the present disclosure may be a system, a method, a computer program product, and others. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Readers will appreciate that the steps described herein may be carried out in a variety ways and that no particular ordering is required. It will be further understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
identifying, from a snapshot of at least a portion of data stored on a block storage device, one or more subregions of the data that are associated with an application, wherein the block storage devices is included with a storage system that includes a plurality of block storage devices; and compiling, from statistics maintained for each of the one or more sub-regions of the stored data associated with the application, quantifiable characteristics for the application, including information describing the application's utilization of the storage system.

2. The method of claim 1 wherein identifying one or more sub-regions of the data stored on the block storage device that are associated with the application further comprises:
identifying one or more application related components stored on the block storage device; and
identifying, in dependence upon the one or more application related components stored on the block storage device and an application profile that includes information identifying one or more components of the application, one or more sub-regions of the data stored on the block storage device that are associated with the application.

3. The method of claim 1 wherein identifying one or more sub-regions of the data stored on the block storage device that are associated with the application further comprises:
selecting a known application type;
reading a portion of the one or more sub-regions of the data; and
determining, in dependence upon the data contained in the portion of the one or more sub-regions, whether the one or more sub-regions are associated with the known application type.

4. The method of claim 1 wherein compiling, from statistics maintained for each of the one or more sub-regions of the stored data associated with the application, quantifiable characteristics for the application, including information describing the application's utilization of the storage system further comprises updating quantifiable characteristics for the application in response to one or more of the sub-regions of the stored data associated with the application being accessed.

5. The method of claim 1 further comprising receiving a request for quantifiable characteristics for the application.

6. The method of claim 1 further comprising presenting, to a user of the storage system, the quantifiable characteristics for the application.

7. The method of claim 1 further comprising:
detecting that a storage system objective was not satisfied; and
identifying, in dependence upon quantifiable characteristics for a plurality of applications, an application that most significantly contributed to not satisfying the storage system objective.

8. The method of claim 1 further comprising:
tracking historical quantifiable characteristics for the application;
determining, in dependence upon the historical quantifiable characteristics for the application and the quantifiable characteristics for the application, whether a deviation threshold has been met.

9. The method of claim 1 further comprising:
tracking historical quantifiable characteristics for the application;
projecting, in dependence upon the historical quantifiable characteristics for the application and the quantifiable characteristics for the application, future quantifiable characteristics for the application.

10. An apparatus including a computer processor and a computer memory, the computer memory including computer program instructions that, when executed by the computer processor, cause the apparatus to carry out the steps of:
identifying one or more sub-regions of data stored on a block storage device that are associated with an application, wherein the block storage device is included with a storage system that includes a plurality of block storage devices, including:
reading a portion of the one or more sub-regions of the data; and
determining, in dependence upon the data contained in the portion of the one or more sub-regions, whether the one or more sub-regions are associated with a known application type; and
compiling, from statistics maintained for each of the one or more sub-regions of the stored data associated with the application, quantifiable characteristics for the application, including information describing the application's utilization of the storage system.

11. The apparatus of claim 10 wherein identifying one or more sub-regions of the data stored on the block storage device that are associated with the application further comprises:
identifying one or more application related components stored on the block storage device; and
identifying, in dependence upon the one or more application related components stored on the block storage device and an application profile that includes information identifying one or more components of the application, one or more sub-regions of the data stored on the block storage device that are associated with the application.

12. The apparatus of claim 10 wherein identifying one or more sub-regions of the data stored on the block storage device that are associated with an application further comprises identifying, from a snapshot of at least a portion of the data stored on the block storage device, one or more sub-regions of the data stored on the block storage device that are associated with the application.

13. The apparatus of claim 10 wherein compiling, from statistics maintained for each of the one or more sub-regions of the stored data associated with the application, quantifiable characteristics for the application, including information describing the application's utilization of the storage system further comprises updating quantifiable characteristics for the application in response to one or more of the sub-regions of the stored data associated with the application being accessed.

14. The apparatus of claim 10 further comprising computer program instructions that, when executed by the computer processor, cause the apparatus to carry out the step of receiving a request for quantifiable characteristics for the application.

15. The apparatus of claim 10 further comprising computer program instructions that, when executed by the computer processor, cause the apparatus to carry out the step of presenting, to a user of the storage system, the quantifiable characteristics for the application.

16. The apparatus of claim 10 further comprising computer program instructions that, when executed by the computer processor, cause the apparatus to carry out the steps of:
detecting that a storage system objective was not satisfied; and
identifying, in dependence upon quantifiable characteristics for a plurality of applications, an application that most significantly contributed to not satisfying the storage system objective.

17. The apparatus of claim 10 further comprising computer program instructions that, when executed by the computer processor, cause the apparatus to carry out the steps of:
- tracking historical quantifiable characteristics for the application;
- determining, in dependence upon the historical quantifiable characteristics for the application and the quantifiable characteristics for the application, whether a deviation threshold has been met.

18. The apparatus of claim 10 further comprising computer program instructions that, when executed by the computer processor, cause the apparatus to carry out the steps of:
- tracking historical quantifiable characteristics for the application;
- projecting, in dependence upon the historical quantifiable characteristics for the application and the quantifiable characteristics for the application, future quantifiable characteristics for the application.

* * * * *